(12) United States Patent
Kashima

(10) Patent No.: US 6,259,496 B1
(45) Date of Patent: Jul. 10, 2001

(54) BACKLIGHT DEVICE AND LIGHT TRANSMISSION TYPE DISPLAY APPARATUS

(75) Inventor: Keiji Kashima, Shinjuku-Ku (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/325,127

(22) Filed: Jun. 3, 1999

(30) Foreign Application Priority Data

Jun. 12, 1998 (JP) .................................................. 10-164868

(51) Int. Cl.$^7$ ................................................ G02F 1/1335
(52) U.S. Cl. ................................................. 349/62; 349/66
(58) Field of Search ................................ 349/66, 95, 115, 349/96

(56) References Cited

U.S. PATENT DOCUMENTS

| 5,235,443 | 8/1993 | Barnik et al. . |
| 5,295,009 | 3/1994 | Barnik et al. . |
| 5,721,603 | 2/1998 | De Vaan et al. . |
| 5,828,488 | 10/1998 | Ouderkirk et al. . |
| 5,856,855 | * 1/1999 | Mol et al. .............................. 349/115 |
| 6,025,897 | * 2/2000 | Weber et al. ........................... 349/62 |
| 6,104,454 | * 8/2000 | Hiyama et al. ......................... 349/96 |

FOREIGN PATENT DOCUMENTS

| 3-45906 | 2/1991 | (JP) . |
| 6-324333 | 11/1994 | (JP) . |
| 9-506985 | 7/1997 | (JP) . |

* cited by examiner

*Primary Examiner*—James A. Dudek
(74) *Attorney, Agent, or Firm*—Parkhurst & Wendell, LLP

(57) ABSTRACT

In a backlight device 10 comprising a light guide 12, a light source 14, a prism sheet 16, a polarized beam splitter sheet 18, and a light reflection sheet 20, the light reflection sheet 20 is composed with the provision of a regular reflection plane 20A in a shape of flat surface, and the direction of the normal standing on the regular reflection plane 20A is substantially the same as the directions of the normals standing respectively on the above-mentioned prism sheet 16 and on the polarized beam splitter sheet 18.

7 Claims, 7 Drawing Sheets ic filter. Moreover, since a beam scattered by a scattering member is again made incident on the cholesteric filter to be utilized, most of the reflected beam is lost before reaching the scattering member due to its re-reflection on a reflection layer of the cholesteric filter.

BACKLIGHT DEVICE AND LIGHT TRANSMISSION TYPE DISPLAY APPARATUS

BACKGROUND OF THE INVENTION

1. Field of the Invention

The present invention relates to a backlight device used for illuminating a light transmission type of display apparatus from its rear face side, and a light transmission type of liquid crystal display apparatus using the same.

2. Description of the Related Arts

A liquid crystal display apparatus which is used as a display for a computer or television monitor uses a liquid crystal layer for modulating intensity of polarized light that is generated by light transmission through a polarizer, for example, such that, as illustrated by FIG. 13 where reference numeral 1 denotes a typical conventional liquid crystal display apparatus, light emitted from a light source 3 of a backlight device 2 is to be incident onto a side end face 4A of a light guide 4 in a substantially plate form, and to be outputted from a light output end face 4B which is shown as an upward end in the Figure, and the light emanated therefrom is to be diffused to an extent with a diffuser sheet 5 and to be converged with a prism sheet 6, so that the diffused light can illuminate, with directivity, a liquid crystal display panel 7 from its rear side.

In the backlight device 2, the source light which enters from the side end face 4A propagates by repeating total reflections in the light guide 4, and a part of the light is reflected by a light diffusing element 4D which is provided on an end face 4C arranged opposite to the output end face 4B and is emanated from the output end face 4B toward the liquid crystal display panel 7 through the diffusing sheet 5, while another part of the light in the light guide is emanated from the opposite end face 4C downward in the Figure and is reflected by a light reflection sheet 8 placed in the bottom to be returned into the light guide 4. The light diffusing element 4D may be substituted by fine rugged spots or by a large number of minute V-grooves provided on the surface and/or the rear face of the light guide 4.

The prism sheet 6 is a sheet on which a plurality of triangular unit prisms 6A (having a cross section of a triangle with or without a grounded vertex), or unit lenses (not shown in the Figure), each of which has a semicircular or semielliptical cross section, are arranged so that their ridge-lines are parallel to each other.

The liquid crystal display panel 7 is constituted of a liquid crystal cell 7A and polarizers 7B and 7C, in such a way that the liquid crystal cell 7A has a liquid crystal layer (TN type or STN type of liquid crystal, liquid crystal for IPS or for VA, or the like) sandwiched in a pair of glass or plastic substrates (not shown), and that the polarizers 7B and 7C hold the outside faces of the liquid crystal cell (top and bottom faces in FIG. 13) between them.

Another conventional liquid crystal display apparatus 1A shown in FIG. 14 differs from the liquid crystal display apparatus 1 in FIG. 13 in that the prism sheet 6 in the backlight device 2A is arranged oppositely to that in the backlight device 2 in FIG. 13, that is, in FIG. 14, the unit prisms 6A arranged with their vertex downward, in the manner opposite to that of the unit prisms 6A in FIG. 13, and the diffuser sheet 5 is arranged on the upper side of the prism sheet 6. The light diffuser element 4D may be substituted by fine rugged spots or by a large number of minute V-grooves provided on the surface and/or the rear face of the light guide 4, in the same way as previously described for the light diffusing element 4D shown in FIG. 13.

The structure other than described above is the same as that in the liquid crystal display apparatus 1 in FIG. 13. Therefore, the same reference numerals are attached to the same elements in FIG. 14, and the explanation thereof is omitted.

The backlight device 2B in a further different conventional liquid crystal display apparatus 1B in FIG. 15 differs from the backlight device 2A shown in FIG. 14 in that the diffuser sheet 5 in the backlight device 2A shown in FIG. 14 is substituted by a second prism sheet 9 whose triangular prisms are directed perpendicular to those of the prism sheet 6.

The structure other than described above is the same as that in the liquid crystal display apparatus 1A in FIG. 14. Therefore, the same reference numerals are attached to the same elements in FIG. 15, and the explanation thereof is omitted.

In all of the liquid crystal display apparatuses 1, 1A, and 1B, the liquid crystal cell 7A is sandwiched between the polarizers 7B and 7C, and the polarizers 7B and 7C absorb about 50% of the incident light beams so that the efficiency for using the light (transparency) lowers; therefore, for obtaining sufficient brightness on the surface of the liquid crystal display panel 7, it is necessary to make more source light incident onto the polarizer 7B and consequently, not only higher power is consumed by the light source 3 in the backlight device but also practical problems, such as unclear display on the liquid crystal display panel 7, are caused because the heat from the light source 3 adversely affects the liquid crystal layer in the liquid crystal cell 7A.

In order to solve the above-mentioned problems, the following prior art invention for improving the efficiency in using light was proposed in, for example, Laid-Open Japanese Patent Application (JP-A-) Hei-3-45906: A polarized beam splitter sheet comprising a cholesteric liquid crystal layer is used to separate non-polarized light from a backlight device into two circularly polarized light beams which rotate oppositely to each other, and then one of the circularly polarized light beams is made incident on a liquid crystal display panel, and the other circularly polarized light beam is returned to the light source side so as to be introduced again into the polarized beam splitter sheet by such means as a curved mirror in the backlight device, for use to improve the light use efficiency.

In the invention disclosed in Laid-Open JP-A- Hei-6-324333, a non- polarized light beam from a light source is introduced to a diffuser device (which corresponds to a light diffuser sheet) and a beam converging element (which corresponds to a prism sheet), and then to a cholesteric filter where a reflected polarized beam is depolarized using the aforementioned diffuser device and again made incident on the cholesteric filter so as to be reused.

In the invention disclosed in Laid-Open Japanese Patent Publication (JP-P-) Hei-9-506985, a non-polarized light beam from a light source is introduced to an optical structure (which corresponds to a prism sheet) to be made incident on a reflection polarizer, and a polarized light beam which is reflected therefrom is reflected back by using a diffusing reflection surface so as to be reentrant on the reflection polarizer and reused.

The invention that is disclosed in JP-A- Hei-3-45906 does not utilize a prism sheet, and therefore, cannot be applied to such cases that a scattering light beam converged by a prism sheet is to be split by polarization by means of a cholesteric liquid crystal layer and has a demerit of a lower efficiency in reuse of light because the polarized light beam reflecting on a cholesteric liquid crystal layer is reflected back on a curved surface mirror.

The inventions which are disclosed in JP-A-Hei-6-324333 and in JP-P-Hei-9-506985 have such a problem that, when the brightness is measured using a conventional type of light absorbing polarizer which has a polarized beam splitting sheet arranged on the light output side (end far from a light source) of a prism sheet and a liquid crystal cell arranged further thereon, actually obtained brightness (light use efficiency) is only 1.6 fold whereas the theoretically expected value is 2 fold.

SUMMARY OF THE INVENTION

In the light of the aforementioned problems, an object of the present invention is to provide a backlight device that has a more improved light use efficiency by the use of a relatively simple structure; and a liquid crystal display apparatus using the backlight device.

This object is accomplished by means of a backlight device according to the present invention comprising: a light guide which is made of light transmitting material in a substantially plate form comprising at least one side end face to introduce a light beam and another end face to emanate the light beam; a light source which makes a light beam incident to the light introducing side end face of the light guide; a prism sheet comprising a plurality of unit prisms which are arranged in one dimension or in two dimensions on the light output side of the light guide, and shifts the direction of light beam propagation into a particular direction to emanate the light beam which is incident from the light output end face of the light guide; a polarized beam splitter sheet that can receive the light from the prism sheet, through which one polarized light component of the light is transmitted, and on which the other polarized light component is reflected; and a light reflecting sheet that is arranged on one end face of the light guide standing opposite to the light output end face of the light guide and reflects the light from the light guide to the polarized beam splitter sheet, provided that the light reflecting sheet is provided, on its side which faces to the light guide, with a regular reflection plane in a direct plane form and arranged nearly parallel to the polarized beam splitter sheet.

The present invention provides a backlight device in which the direction of the normal of a polarized beam splitter sheet is substantially the same as the direction of propagation of a light beam which is shifted in a particular direction and emanated from a prism sheet.

The present invention provides a backlight device in which the direction of the normal of a polarized beam splitter, the direction of propagation of light beam which is shifted in a particular direction and emanated from a prism sheet, and the direction of the normal of a regular reflection plane of a light reflection sheet are substantially the same.

The present invention further provides a backlight device in which the cross-sectional shape of a unit prism in a prism sheet is symmetrical to the normal of the prism sheet and the direction of the normal of the prism sheet is substantially the same as the direction of the normal of a regular reflection plane of a light reflection sheet.

The present invention further provides a backlight device whose polarized beam splitter sheet is provided with a cholesteric liquid crystal layer that can separate one circularly polarized light component in an incident light beam from the other light component which is circularly polarized in the reverse direction of rotation, and a ¼ wavelength phase difference layer, or otherwise a backlight device, whose polarized beam splitter sheet has a planar multilayer structure in lamination of double-refractive layers, that demonstrates such a property that, for two light components which have mutually orthogonal directions of vibration in the plane, the difference of refractive index between layers adjacent in the layer thickness direction for one component of light is different from the difference of refractive index between layers adjacent in the layer thickness direction for the other component of light.

Furthermore, the present invention provides a light transmission type of liquid crystal display apparatus which comprises: a planar light transmission type of liquid crystal display panel; and a backlight device arranged on the rear face of the light transmission type of liquid crystal display panel to illuminate the light transmission type of liquid crystal display panel from the rear face.

In the structure of the present invention as mentioned above, the backlight device using a light guide, a light reflection sheet and a polarized beam splitter sheet demonstrates a marked effect in the much greater improvement of brightness of emergent light.

DESCRIPTION OF THE PREFERRED EMBODIMENTS

Referring to the attached drawings, preferred embodiments of the present invention will be described below.

Figure 1:
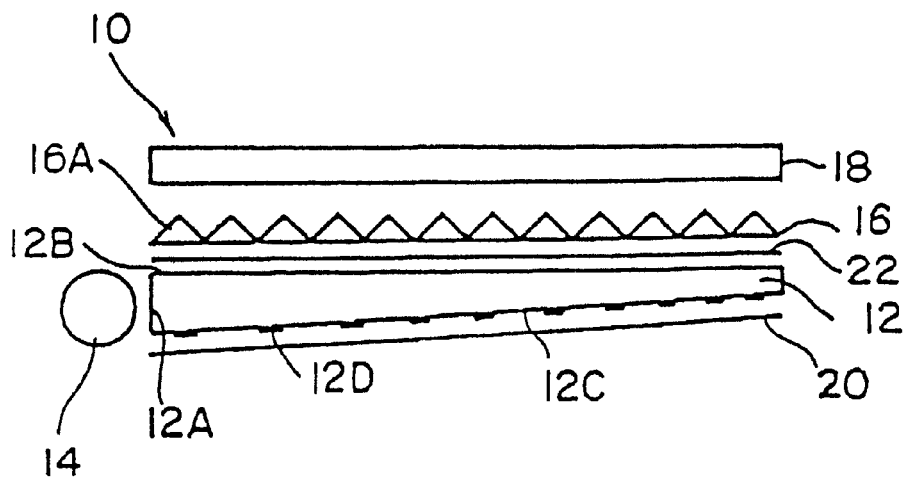
FIG. 1 is a schematic cross section of the first example of a backlight device according to an embodiment of the present invention.

A backlight device 10 shown in FIG. 1 has a light guide 12 made of light transmitting material in a substantial plate form for output of the light which is introduced through one side end face 12A of the light guide from a light output end face 12B which is another end face of the light guide; a linear light source 14 for making light incident on the above-mentioned side end face 12A of the light guide 12 into which the light is introduced; a prism sheet 16 which is arranged on the side of the above-mentioned light output end face 12B of the light guide 12, so that the direction of propagation of a light beam which is emitted from the above-mentioned light output end face 12B is shifted in a particular direction and the light is emanated herefrom; a polarized beam splitter sheet 18 which is arranged upward from the prism sheet 16 in FIG. 1 through which one component of polarized light coming from the prism sheet 16 is transmitted and on which the other component of the polarized light is reflected; a light reflection sheet 20 which is arranged facing to the rear end face 12C of the light guide 12 which stands opposite to the light output end face of the light guide 12, so that the light from the light guide 12 is reflected toward the above-mentioned polarized beam splitter sheet 18; and a light diffusing sheet 22 which is arranged between the light output end face 12B of the above-mentioned light guide and the prism sheet 16 so as to be parallel to them.

The backlight device 10 is provided with the polarized beam splitter sheet 18 and a regular reflection plane 20A which is arranged approximately parallel to the prism sheet 16, and is arranged such that the direction of the light propagation (a particular direction) shifted by the prism sheet 16, the direction of the normal of the polarized beam splitter sheet 18 and the direction of the normal of the regular reflection plane 20A of the light reflection sheet 20 are substantially the same.

The light source 14 may be a linear light source, such as a cool cathode-ray tube arranged in parallel to the side end face 12A of the above-mentioned light guide 12, or a light source wherein a plurality of spot light sources, such as light emitting diodes, are arranged in a line along the side end face 12A.

The light guide 12 has a shape of a parallel plate whose front face (on the side of the light output end 12B) and rear face 12C are approximately parallel, or a shape of a wedge whose end toward the side end face 12A is thicker and the thickness of which becomes thinner as the opposite end is approached, and is composed of a material through which light can penetrate effectively, including acrylic resins such as polymethylmethacrylate (PMMA), polycarbonate resin and glass.

On the rear face 12C of the light guide 12, disposed is a light diffusing layer 12D which is a film composed of a light diffusing material applied in the form of dots or stripes by means of printing or the like. The light diffusing material which forms the light diffusing layer 12D is composed of a light transmitting resin containing $SiO_x$, $TiO_2$, $BaSO_4$, PMMA beads, minute air bubbles, or the like.

The rear face 12C of the light guide 12 may be prepared to diffuse light by forming minute irregularities in the surface. Light diffusing ability may be developed by incorporating a light diffusing material which can provide a minute distribution of refractive index for the light transmissive resin or glass which constitutes the light guide 12.

The prism sheet 16, as disclosed in, for example, JP-A-Sho-60-70601, JP-A-Hei-2-84618 and JP-A-Hei-7-191319, and a Laid Open Utility Model Application Hei-3-69184, is disposed such that unit prisms (unit lenses) 16A are arranged thereupon regularly in one or two dimensions along the plane of the sheet in such a way that the direction of the light beam output from the planar light source is shifted in a particular direction (in the direction of the normal of the light output face in most cases) and that the light is converged. The unit prisms 16A are disposed so that the shape of the cross section of each unit prism is symmetrical to the normal that passes the center of the cross section.

The transparent material for forming the prism sheet 16 may be any one of resins, for example, thermoplastic resins such as polyester resins including polyethylene terephthalate (PET) and polybutylene terephthalate, acrylic resins, including polymethyl metacrylate, polycarbonate resins, polystyrene resins, or polymethylpentene resins, and ionic radiation curable resins such as polyesteracrylate, urethaneacrylate, and epoxyacrylate oligomers and/or acrylate monomers, which are cured by ultra-violet radiation or electro-magnetic radiation with electron beams and is made to have a good light transmission ability. In the case where such a resin is used, the resin having a refractive index of about 1.4 to 1.6 is normally utilized. Furthermore, materials other than resins, such as glass or ceramics may be used when they are light transmissive.

The polarized beam splitter sheet 18 is an element that transmits one polarized light component in the light introduced from the side of the prism sheet 16 to transmit the component of the light upward in FIG. 1 and reflects the other polarized light component toward the prism sheet 16.

The polarized beam splitter sheet 18 has a detailed structure such that, from the side of the light incident end, a PET layer 18D, a cholesteric liquid crystal layer 18C, a ¼-wavelength phase difference layer 18B, and a TAC layer 18A are successively laminated.

The cholesteric liquid crystal layer 18C in the aforementioned structure can be made to have a function of splitting one component of the incident light which has one rotatory polarization direction from the other polarized light component which has the opposite rotatory direction.

Normally, in a cholesteric liquid crystal, the above-mentioned rotatory splitting property is developed based on a physical configuration of molecules, and the light incident in the direction of the helical axis of a planar configuration is split into two circularly polarized light components, that is, into a dextrorotatory light and a levorotatory light, of which one component is transmitted, whereas the other component is reflected.

Using this phenomenon, which is well known as circular dichroism, a circularly polarized light having the same rotatory direction as the direction of helical axis of the cholesteric liquid crystal is selectively scattered and reflected when the rotatory direction of the circularly polarized light is appropriately chosen in relation to the direction of the incident light beam.

The maximum scattering of the rotatory polarized light under the above-mentioned condition occurs at the wavelength $\lambda_0$ which is defined by the following equation:

$$\lambda_0 = n_{av} \cdot p \quad (1)$$

where p is a helical pitch, and $n_{av}$ is the average refractive index in the plane which is perpendicular to the helical axis.

The wavelength bandwidth $\Delta\lambda$ of the reflected light under this condition is expressed by the following equation:

$$\Delta\lambda = n \cdot p \quad (2)$$

where $\Delta n = n (\|) - n (\perp) \cdot n (\|)$ is the maximum refractive index in the plane perpendicular to the helical line and $n (\perp)$ is the maximum refractive index in the plane parallel to the helical axis.

Furthermore, it is known that the wavelength $\lambda_{100}$ of the selectively scattered light which is obliquely incident to the helical axis of a planar configuration is shifted to a shorter wavelength than $\lambda_0$.

The preferred material of the cholesteric liquid crystal is a substance such as disclosed in JP-A-Hei-8-146416, or a chiral-nematic liquid crystal compound which is composed of a nematic liquid crystal compound belonging to Schiff base, an azo compound, an ester compound, or a biphenyl compound, or another nematic liquid crystal compound to whose end group an optically active group such as a 2-methyl-butyl group, a 2-methyl-butoxy group, or a 4-methyl-hexyl group, is coupled.

Normally a high polymer liquid crystal is a high polymer molecule which incorporates a mesogen group originating a liquid crystal property on the positions in its main chain, in its side chain, or in its main and side chains, and the high polymer cholesteric liquid crystal is also produced by introducing, for example, a cholesteryl group into a side chain.

In the cholesteric liquid crystal, the polarized light beam is split such that one circularly polarized component (dextrorotatory or levorotatory) is transmitted and the other component is reflected.

The rear-plate illuminating light used for a liquid crystal display apparatus is normally a linearly polarized incident light, and therefore, the use of ¼-wavelength phase difference plate 18B in addition to the cholesteric liquid crystal layer 18C is preferable.

Further information on the performance of the cholesteric liquid crystal 18C and ¼-wavelength phase difference plate 18B is disclosed in documents, for example, in "Polarizing Color Filters Made from Cholesteric LC Silicone", SID 96 DIGEST, p.110~113.

The light incident angle at which the polarized beam splitting action of the cholesteric liquid crystal layer 18C is maximal depends upon the direction of orientation of the cholesteric liquid crystal, and therefore it is preferred to make the direction of the helical axis thereof nearly the same as the direction of the normal standing on the polarized beam splitter sheet. The methods for the orientation include, a rubbing method which is a prior art and a method using polarized UV light.

Figure 6:
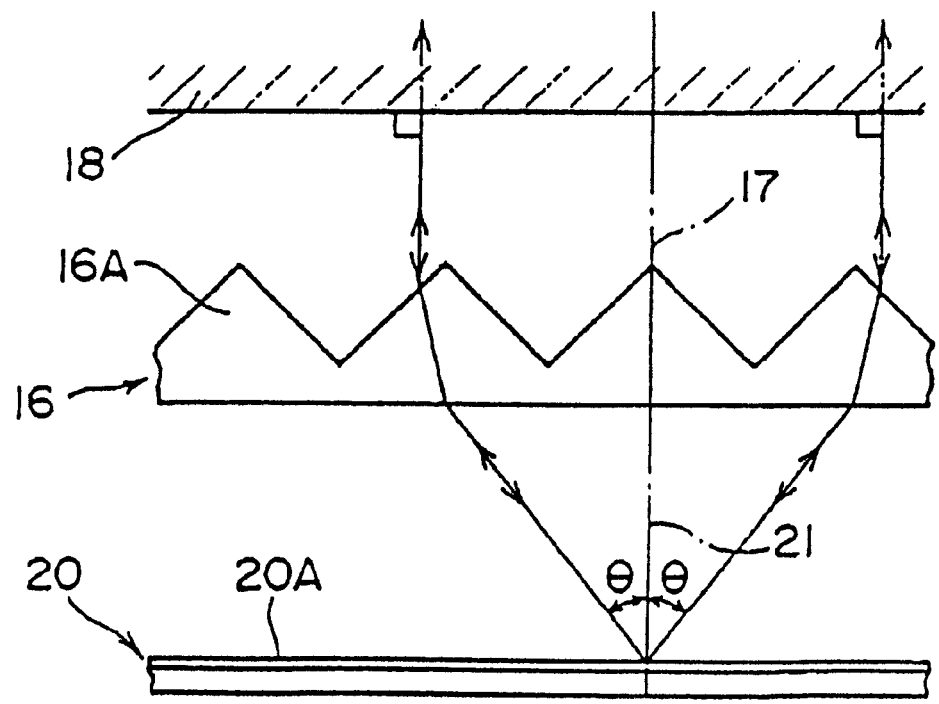
FIG. 6 is a schematic enlarged cross sectional view of an optical arrangement showing a light path of a reflected light through a polarized beam splitter sheet, a prism sheet and a light reflection sheet of a backlight device according to an embodiment of the present invention.

When a light beam is incident to the above-mentioned polarized beam splitter sheet 18A, one circularly polarized light component (dextrorotatory or levorotatory) is transmitted through the cholesteric liquid crystal layer 18C, and then the transmitted circularly polarized light is transformed into a linearly polarized light at the ¼-wavelength phase difference sheet 18B, and, the thus linearly polarized light emerges, after passing through the TAC layer 18D, finally from the end face (light output face) which is shown as an upper face in FIG. 6.

The light reflection sheet 20 whose regular reflection plane facing to the light guide 12 may be any mirror surface having a reflectivity of 80% or more and is composed of whatever material, however, preferably of a metal, such as silver, aluminum, gold, copper, nickel, or chromium, which shows a good mirror surface property, in particular silver from the viewpoint of reflectivity and mirror surface property.

Figure 3:
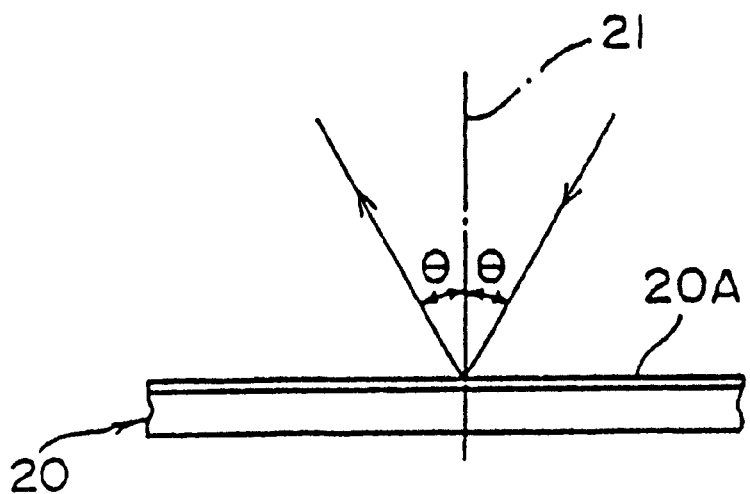
FIG. 3 is a schematic enlarged cross sectional view showing a light reflection condition on a light reflection sheet of a back light device according to an embodiment of the present invention.

The reflection sheet 20 is composed, as shown in FIG. 3, of a sheet of a total thickness of 0.1–1 mm which is provided with a thin-film regular reflection plane 20A having a reflectivity of 80% or more by depositing a silver film by evaporation in thickness of 100–1000 Å onto a surface of a plastic film such as PET.

The regular reflection on the reflection sheet 20 herein referred to means, as shown in FIG. 3, a relationship in which an incident light ray at an incident angle θ referring to a normal 21 standing on a regular reflection plane 20A is reflected at an angle θ which is symmetrical referring to the above-mentioned normal 21 (which is defined as is at the angle zero). However, the reflection sheet 20 may produce a small amount of scattered reflection component for the reason based on the manufacturing of the light reflection sheet 20.

The light diffusing sheet 22 scatters the light coming from the light guide 12 by a small amount and makes the light incident to the prism sheet 16, whose haze value is limited to a value not exceeding 95%, more preferably to a value within a range of 10–50% so as not to make the amount of haze excess.

Following the above, a description is given to the action of the above-mentioned backlight device 10.

The light which emerges from the light source 14 is incident on the light guide 12 from the one side end face 12A of the light guide 12 and propagate to the other side end face standing opposite to the one side end face 12A while repeating total reflections between the light output face 12B and the rear face 12C. The direction of propagation of a part of the light which propagates in the light guide 12 is shifted through the light diffusing layer 12D which is provided on the above-mentioned rear face 12C to be transmitted outside the light guide 12 from the light output face 12B.

On the other hand, the light which is emanated from the rear face 12C of the light guide 12 is reflected on the light reflection sheet 20 and turned back into the light guide 12.

The light emerging from the light output face 12B is partly scattered by the light diffusing sheet 22 and made incident to the prism sheet 16. From this incident light, one circularly polarized component is transmitted by the cholesteric liquid crystal layer 18C of the polarized beam splitter sheet 18, whereas the other circularly polarized component having the reverse rotatory direction is reflected thereby.

One circularly polarized component that is transmitted by the cholesteric liquid crystal layer 18C is transformed into a linearly polarized light through the ¼-wavelength phase difference layer 18B and, after being transmitted through the TAC layer 18A, emanated from the upper face (the light output face) shown in the Figure.

On the other hand, the component of circularly polarized light having the opposite rotatory direction goes through the prism sheet 16, the light diffusing sheet 22 and the light guide 12, thereby the polarization of the light being disturbed to an extent, and, is emanated from the rear face 12C to be regularly reflected by the light reflection sheet 20, then goes through the light guide 12, the light diffusing sheet 22 and the prism sheet 16, thereby the polarization of the light being further disturbed to another extent, to be incident on the polarized beam splitter sheet 18 again.

As mentioned above, the light emerging from the light output face 12B of the light guide 12 goes along the above-mentioned route (light path), and, therefore, the polarization condition of the reflected light from the polarized beam splitter sheet 18 is changed and the light is incident on the above-mentioned polarized beam splitter sheet 18 again, so that the intensity of a particular light component (whichever of dextrorotatory and levorotatory circularly polarized light components) which goes through the polarized beam splitter sheet 18 is increased.

The presence of the light diffusing sheet 22, however, does not constitute an essential condition for the embodiment of the present invention because, without the light diffusing sheet 22, the polarization of light is disturbed by the prism sheet 16 and the light guide 12 through which the light goes.

In this process, the function of regular light reflection which is provided for the light reflection sheet 20 enables the use of almost all the illuminating light from the light source 14 and greatly improves the efficiency of use of the light.

Figure 4:
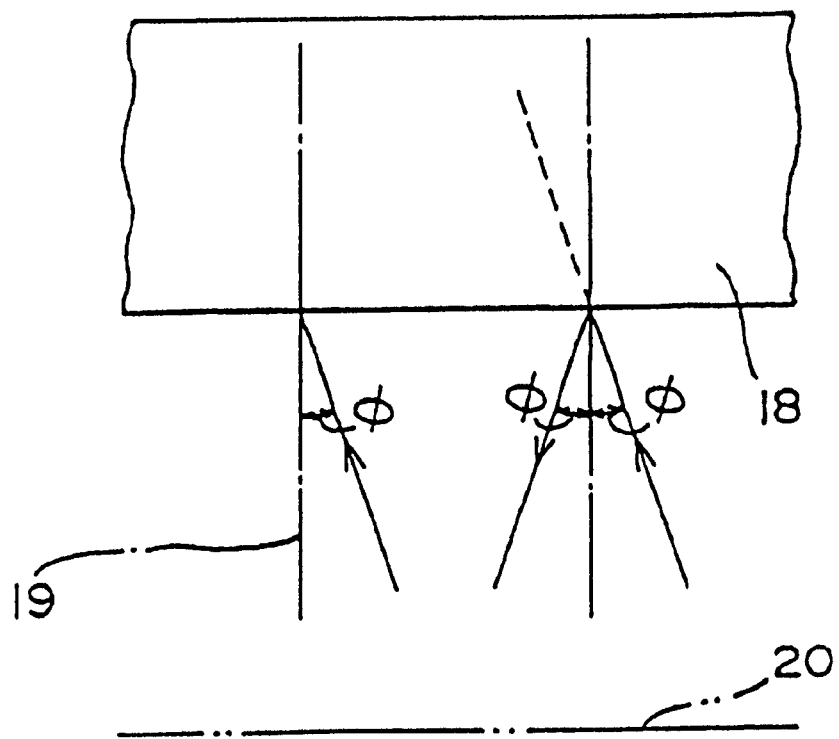
FIG. 4 is a schematic enlarged cross sectional view showing a light reflection condition on a polarized beam splitter sheet of a backlight device according to an embodiment of the present invention.

The above-mentioned effect is realized because, as shown in FIG. 4, the light which is reflected at an angle φ referring to the normal 19 standing on the polarized beam splitter sheet 18 is regularly reflected by the light reflection sheet 20 and is made incident again to the polarized beam splitter splitter sheet 18 at the angle φ, so that the light is surely returned to the polarized beam splitter sheet 18.

Whereas, when the regular reflection plane 20A of the light reflection sheet 20 reflects light with a scattering effect, the reflected light is diffused by scattering in all directions and a loss of light due to the generation of stray light occurs so that the light utilization efficiency is largely decreased.

Figure 5:
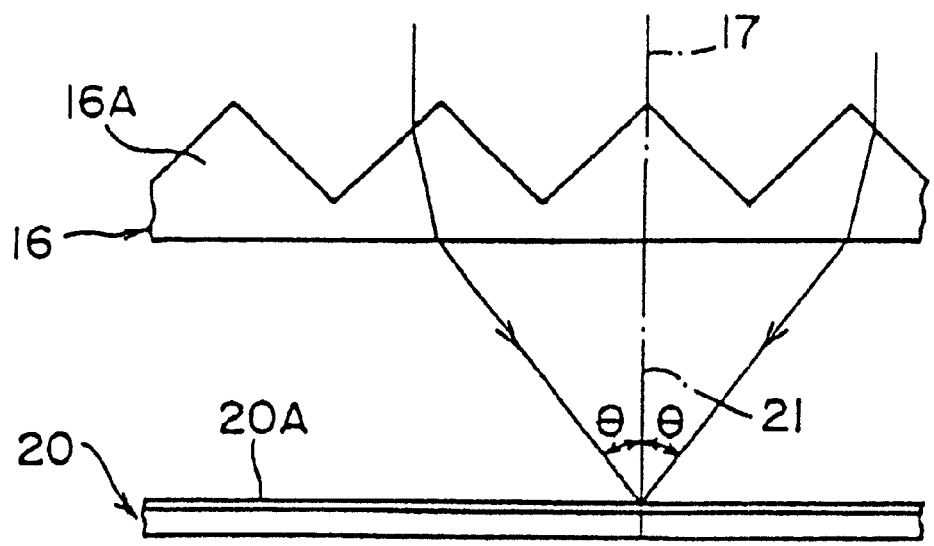
FIG. 5 is a schematic enlarged cross sectional view of an optical arrangement showing a light path of a reflected light through a prism sheet and a light reflection sheet of a backlight device according to an embodiment of the present invention.

Particularly, in the above-mentioned embodiment of the present invention, as shown in FIG. 5, the particular direction of light defined by the prism sheet 16 (the direction in which the scattered light is concentrated by the effect of the prism sheet 16) and the direction of the normal 21 standing on the regular reflection plane 20A of the light reflection sheet are substantially the same to each other so as to make substantially zero the angle of the incidence of the light directed to the polarized beam splitter sheet 18, and thus, one circularly polarized component of the light which is reflected on the polarized beam splitter sheet 18 is reflected by the light reflection sheet 20 and, by tracing back the same light path, correctly reaches the polarized beam splitter sheet 18 through the prism sheet 16.

Furthermore, the prism sheet 16 has, as mentioned above, a shape symmetrical referring to the normal 17 of the prism sheet 16, and therefore the direction of the normal 17 of the prism sheet 16 is substantially the same as the direction of the normal 21 of the light reflection sheet 20 so that the reflected light returns to the polarized beam splitter sheet 18 with a high efficiency in the similar way as described above.

Namely, since the polarized beam splitter sheet 18, the prism sheet 16 and the light reflection sheet 20 are disposed such that, as shown in FIG. 6, the directions of the normal of the respective sheets are substantially the same to each other, and, the polarized beam splitter sheet 18 and the light reflection sheet 20 being provided with a reflection property whereby light is reflected substantially regularly, the shape of the cross section of the prism sheet being, as mentioned above, symmetrical in relation to the above-mentioned normal 17, and the direction of the maximum intensity of the scattered light with directivity from the prism sheet 16 being substantially the same as the direction of the normal 19 standing on the polarized beam splitter sheet 18, the other circularly polarized light component which is reflected at the polarized beam splitter sheet, which is a part of the most of the scattered light having directivity from the prism sheet 16, is shifted to a polarized state on passing through the prism sheet 16, reflected by the light reflection sheet substantially in regular fashion, shifted in polarized state while passing again through the prism sheet 16, and returned to the polarized beam splitter sheet, where a part of the returned light is transmitted and the rest of the returned light is reflected back again. Thus, the most part of the light which is emanated from the prism sheet 16 goes back and forth many times on the above-described path to be transmitted through the polarized beam splitter sheet 18, so that a polarized-light backlight device of a very high efficiency can be obtained.

In FIG. 6 the form of the light path of the above-mentioned light cycle is closed, but, in actual cases, the light path is not perfectly closed because of errors within manufacturing tolerances of component parts used in the structure of the backlight device, errors within the assembling tolerances of the backlight, and the like, and, therefore, the light from the above-mentioned light source 14 may enter this light path.

Therefore, while the light which enters the polarized beam splitter sheet in a slightly oblique direction goes back and forth on the above-mentioned light path for plural times, the above-mentioned circularly polarized component of the light passes through the polarized beam splitter sheet 18 until the light finally goes outside the above-mentioned path.

The above-mentioned light reflection sheet 20 may be a sheet whose optical property is of a substantially regular reflection and the property of inverting the direction of the rotation (rotatory direction) of circularly polarized light is not necessarily provided for the light reflection sheet 20.

The reason for the description given above is such that, when the light which is reflected from the cholesteric liquid crystal layer 18C in the polarized beam splitter sheet is reflected on the light reflection sheet 20, the condition of polarization is shifted by the prism sheet 16 to make ineffective the supposed inversion of the rotatory direction by the light reflection sheet 20.

Furthermore, in the back light device 10 related to the above-mentioned embodiment of the present invention, the form of the light guide 12 is made to have a shape of a wedge whose thickness is gradually made smaller from the one side end face 12A toward the opposite standing other side end face oppositely.

Figure 7:
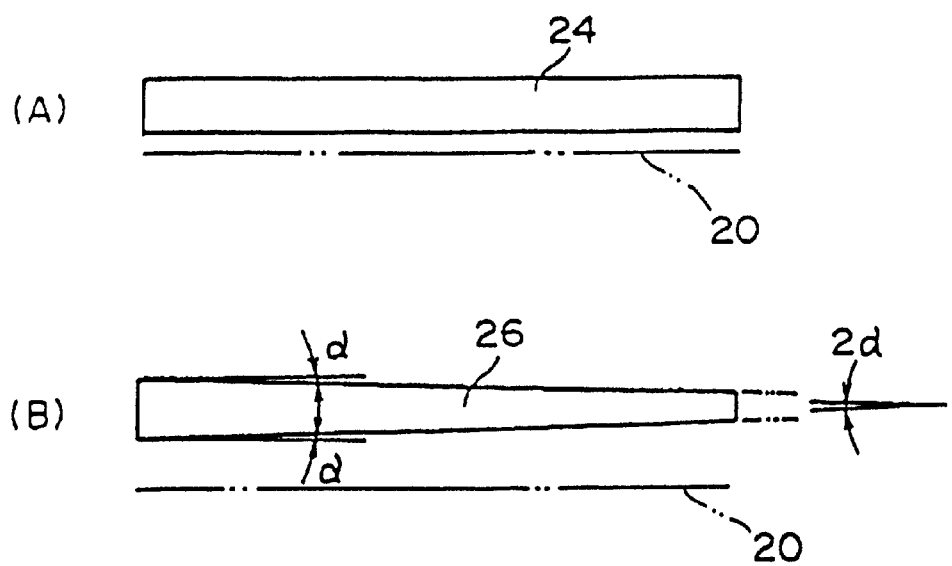
FIG. 7 is a cross section showing a shape of a light guide of a backlight device according to an embodiment of the present invention.

While a light guide 24 having a form of a parallel plate as shown in FIG. 7(A) can also be used without any particular objection, the light guide 12 having such a shape of a wedge is normally a trapezoid which is formed by removing the summit of a prism having a top angle α=10° or the like.

Therefore, in the case where the light reflected from the cholesteric liquid crystal layer 18C in the polarized beam splitter sheet 18 goes back and forth plural times, as described above, in the space between the cholesteric liquid crystal layer and the light reflection sheet 20, the light undergoes the prism effect of the light guide made in a shape of wedge, and the course of the light propagation is gradually shifted from the optical path which is shown in FIG. 5 or in FIG. 6.

In many cases, the most part of the amount of the light passes through the polarized beam splitter sheet 18 by repeatedly going back and forth plural times between the polarized beam splitter sheet 18 and the light reflection sheet 20, and the efficiency of the use of light is not so much decreased in comparison with the case where a light guide 24 formed in a parallel plate such as shown in FIG. 7(A) is used.

However, whenever a higher efficiency is mainly pursued, it is preferred that, in order to minimize the influence of the prism effect of a light guide having a shape of wedge, a light guide 26 is formed, as shown in FIG. 7(B), such that a light output face 26B and a rear face 26C of the light guide 26 are arranged obliquely by an angle α/2 relative to the above-mentioned light reflection sheet 20, the polarized beam splitter sheet 18, or the prism sheet 16.

Figure 8:
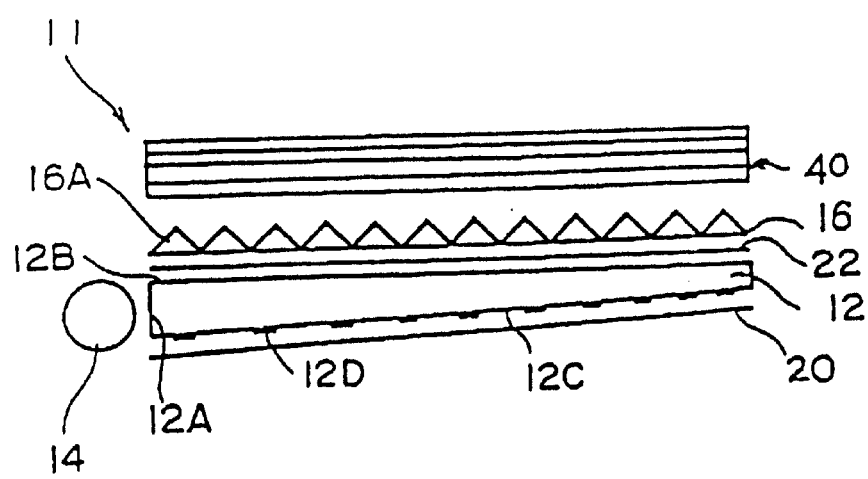
FIG. 8 is a schematic cross section of the second example of a backlight device according to an embodiment of the present invention.

Following the above, another embodiment of the present invention is described referring to FIG. 8.

A backlight device 11 shown in FIG. 8 comprises a polarized beam splitter sheet 40 in a form of a planar multilayer sheet made up of 4 layers each having double refraction property and so composed that, the difference of refractive index between the layers which are adjacent to each other in the direction of thickness is substantially zero for one component of the light of two components which have mutually perpendicular directions of vibration in a plane, while the difference in refractive index between the layers which are adjacent to each other in the direction of thickness is substantially non-zero for the other component of the light, and, whereby, as mentioned above, one component of the light is transmitted while the other component of the light is reflected. Other structure is the same as that of the above- mentioned backlight device 10.

Each one of the double refraction layers 40A–40D that compose the above-mentioned polarized beam splitter sheet 40 can be obtained, as disclosed, for example, in JP-A-Hei-3-75705, by a method such as elongation or by the like, of the material having an in-plane double refractivity (anisotropic refractivity), including resins such as polycarbonate resin, polyester resin, polyvinyl alcohol resin, cellulose acetate, and the like.

A further detail of the structure of the polarized beam splitter sheet 40 is such that, as shown in an enlargement of FIG. 9, it is composed of 4 double-refractive layers 40A–40D and, in the case where two directions of light vibration are set as shown by the notations X and Y in FIG. 9, the refractive index of the respective double-refractive layers is to be as follows.

For example, the values of refractive index for the light vibrating in the direction of x-axis in the double refractive layers 40A, 40B, 40C, and 40D are substantially the same value of $n_x$, and, therefore, the difference $\Delta n_x (=|n_x-n_x|)$ of refractive index in the direction of x-axis between adjacent layers is substantially zero.

Furthermore, either of the values of refractive index for the light which vibrates in the direction of y-axis of the double refractive layers 40A and 40C is $n_{y1}$ and either of the values of refractive index for the light which vibrates in the direction of y-axis of the double refractive layers 40B and 40D is $n_{y2}$ ($n_{y1} \neq n_{y2}$), and, therefore, the difference $\Delta n_y$ of the values of refractive index in the direction of the y-axis between adjacent layers is substantially non-zero.

The above-mentioned is a condition ($\Delta n_x \neq \Delta n_y$) that the difference $\Delta n_x$ of the values of refractive index in x-direction between adjacent layers is substantially different from the difference $\Delta n_y$ of the values of refractive index in y-direction between adjacent layers.

The use of a polarized beam splitter sheet which is formed in a planar multilayer structure, in which two mutually perpendicular directions of the light vibration are present and the difference in the value of refractive index between layers adjacent to each other in one vibration direction of the two vibration directions differs from the difference in the value of refractive index between layers adjacent to each other in the other vibration direction, makes polarized light split.

Namely, the reflection of the light which vibrates in one direction (for example, in y-axis direction) in which the difference in the value of refractive index is larger, is stronger than the reflection of the light which vibrates in the other direction (for example, in x-axis direction) in which the difference in the value of refractive index is smaller, and, the transmission of the light which vibrates in one direction (for example, in x-axis direction) in which the difference in the value of refractive index is smaller, is more than the transmission of the light which vibrates in the other direction (for example, in y-axis direction)in which the difference in the value of refractive index is larger.

And, a more preferred embodiment is obtained when the smaller value of the differences in refractive index is substantially zero. By this embodiment, the light which vibrates in the direction that gives the smaller difference in the value of refractive index is totally transmitted without being reflected.

Namely, in the above-described embodiment, a polarized beam splitter sheet, which is composed of a planar multi-layer structure and in which two directions of light vibration being mutually perpendicular in a plane are present, and, of which values of refractive index in one direction (for example, x-axis direction) of the two directions are substantially the same in adjacent layers, whereas of which values of refractive index in the other direction (for example, y-axis direction) of the two directions differ from each other in adjacent layers. The use of such a polarized beam splitter sheet enables the light splitting (for example, transmitting the light which vibrates in x-axis direction and reflecting the light which vibrates in y-axis direction) in a more preferable fashion. Naturally, the larger is the difference in the value of refractive index with a larger value, the higher polarized beam splitting performance is obtained.

Referring to the above-mentioned example, the above-mentioned effect is caused by the following fact: the refractive index in the body of the planar multilayer structure is substantially uniform for the light which vibrates in x-axis direction, and, therefore, only a slight amount of surface reflections occur on the input plane and the output plane, respectively, of the sheet of the planar multilayer structure; and, the refractive index in the body of the planar multilayer structure varies from a layer to the other adjacent layer for the light which vibrates in y-axis direction, and, therefore, surface reflections occur on the input plane and the output plane, respectively, of the sheet of the planar multilayer structure, and surface (boundary) reflections also occur on the boundaries of layers in the sheet of the planar multilayer structure. Therefore, the greater the number of layers constituting the polarized beam splitter sheet, the more the light reflection occurs and the more the light which vibrates in y-axis direction is reflected.

Figure 9:
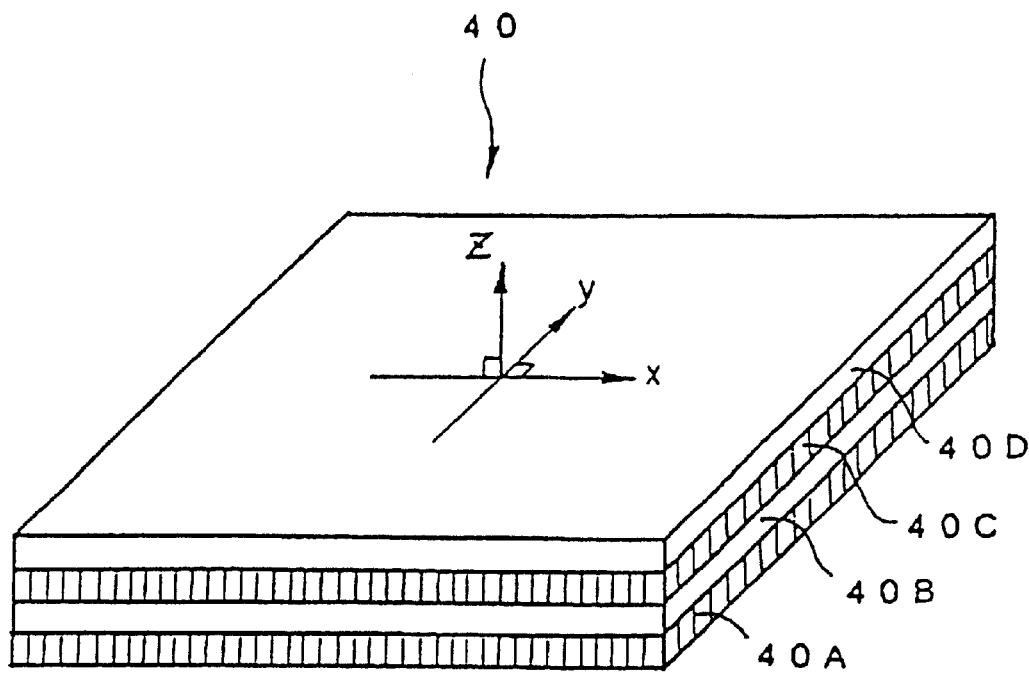
FIG. 9 is a schematic enlarged perspective view of a polarized beam splitter sheet of a backlight device according to the second embodiment of the present invention.
Figure 10:
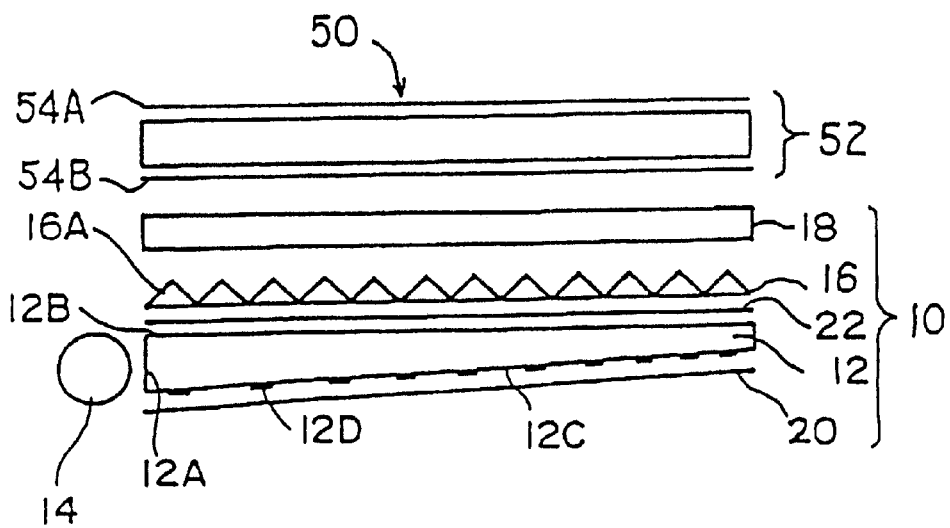
FIG. 10 is a schematic cross section showing a liquid crystal display apparatus according to an embodiment of the present invention.

Furthermore, the polarized beam splitter sheet in the embodiment of the present invention is not limited to a sheet of 4-layer structure as shown in FIGS. 8 and 9, and it may have a structure of at least 3 layers, or ideally, of greater the than 5 layers. The more number of the double refractive layers used for composing the polarized beam splitter sheet, the more effectively the above-mentioned reflection occurs to reflect the light vibrating in the other direction. In practical cases, the number of layers may be 100 or the like.

And, the angle of incidence of the light at which the maximum polarized beam splitting is obtained in the polarized beam splitter sheet is such that the light is made incident parallel to the direction of the normal standing on the above-mentioned polarized beam splitter sheet.

Furthermore, the measurement of a polarized beam splitting action may be done by using linearly polarized light whose light components are mutually perpendicular in the direction of vibration of the light.

Following the above, a description is given to a liquid crystal display apparatus 50 related to the embodiment of the present invention. The liquid crystal display apparatus 50 is composed by arranging a liquid crystal panel 52 in front of the light output face of the backlight device 10 such as described in the above-mentioned FIG. 1.

The liquid crystal display apparatus 50, an apparatus of a light transmission type, is composed in such a way that, whose picture elements that compose a liquid crystal picture plane are illuminated respectively on the rear side by the light emerging from the above-mentioned backlight device 10 whose liquid crystal panel 52 has a front polarizer 54A and a rear polarizer 54B, and, the polarized beam transmitting axis of the rear (on the side facing the backlight device 10) polarizer 54B is oriented substantially coincident to the axis of polarization of the light which is delivered from the planar backlight device 10 so as to efficiently transmit the polarized light. In this liquid crystal display apparatus 50, as mentioned above, the loss of the illuminating light delivered by the backlight device 10 is very low, and, therefore, a bright picture display can be formed.

Figure 11:
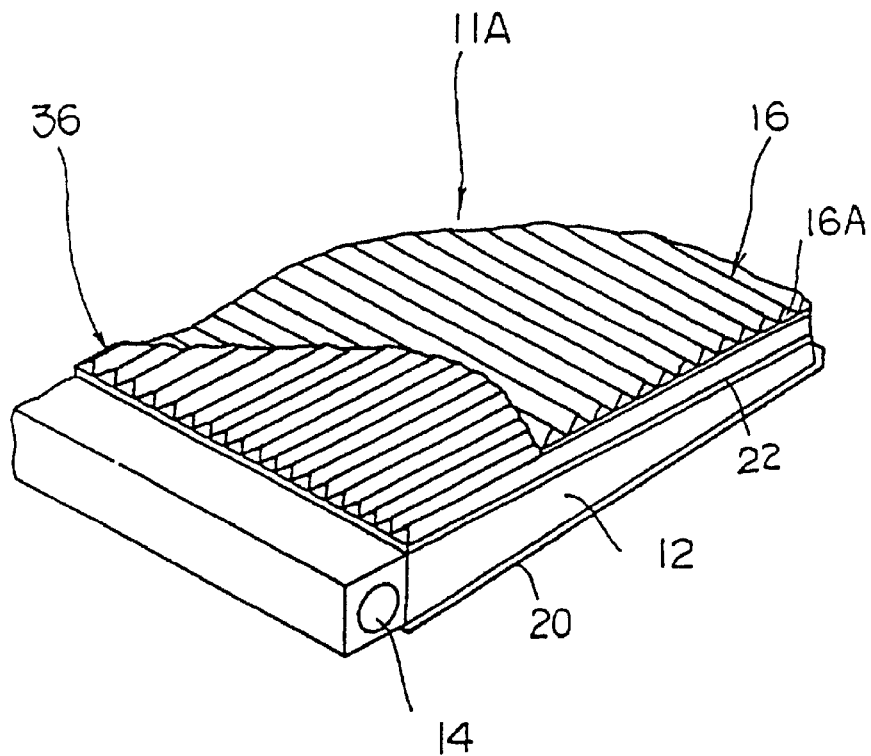
FIG. 11 is a perspective view showing a principal part of a backlight device according to the third embodiment of the present invention.
Figure 12:
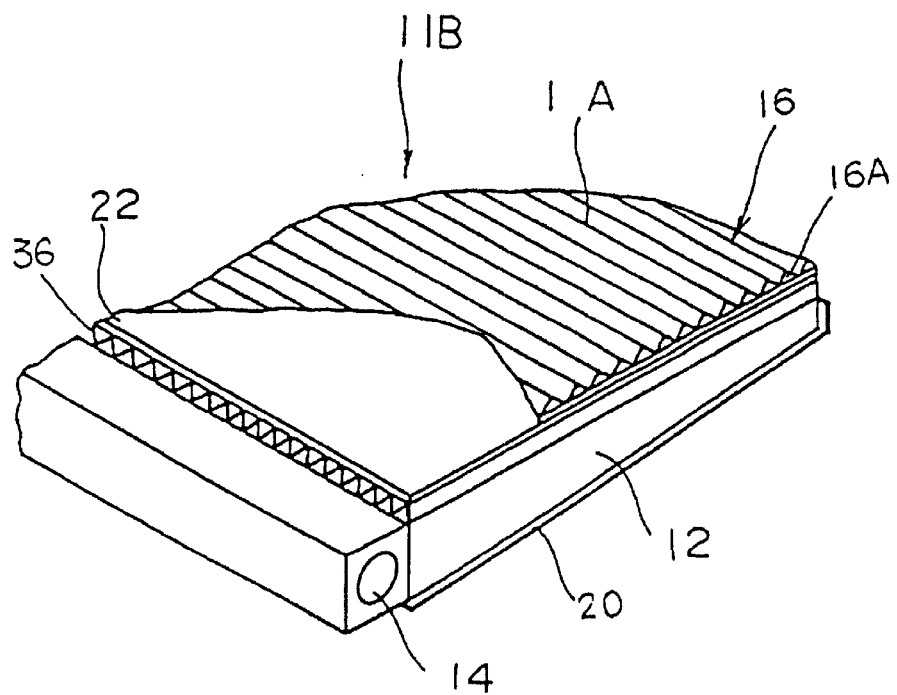
FIG. 12 is a perspective view showing a principal part of a backlight device according to the fourth embodiment of the present invention.
Figure 13:
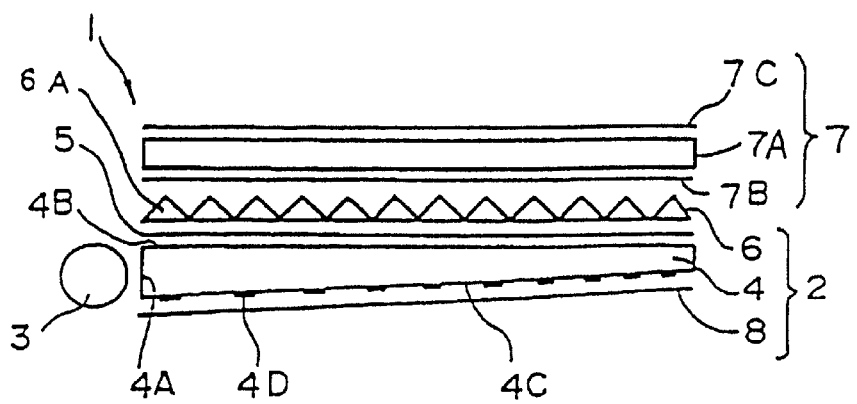
FIG. 13 is a schematic cross section showing a liquid crystal display apparatus comprising a backlight device in the prior art.
Figure 14:
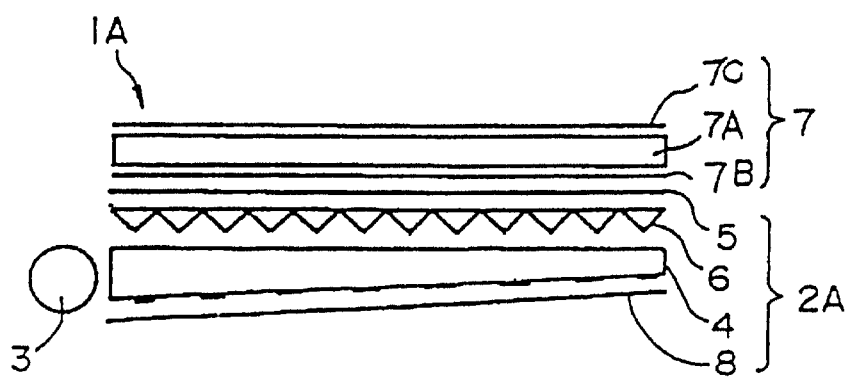
FIG. 14 is a schematic cross section showing a liquid crystal display apparatus comprising another backlight device in the prior art.
Figure 15:
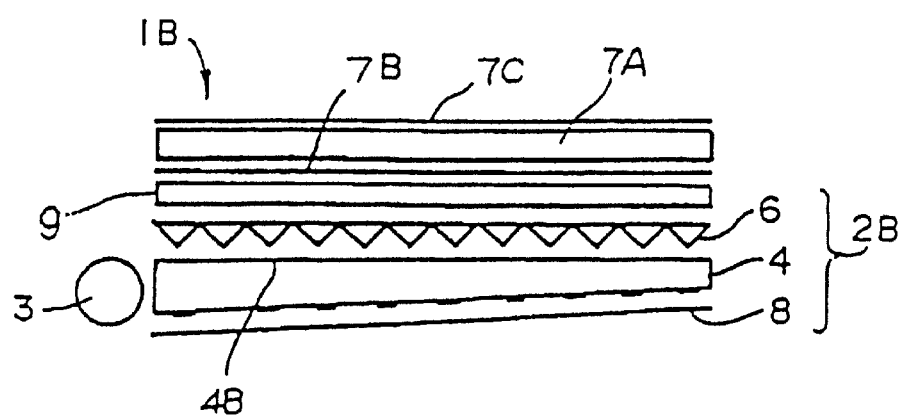
FIG. 15 is a schematic cross section showing a liquid crystal display apparatus comprising another backlight device in the prior art.

Furthermore, the embodiment of the present invention is not limited to the use of single prism sheet as is mentioned above, and, a prism sheet made by a combination of two prism sheets may be used, for example, such as the combination of a second prism sheet to the prism sheet 16 in backlight devices 11A and 11B shown in FIGS. 11 and 12 respectively. In this case, one prism sheet 36 (or 16) may be disposed such that whose unit prisms are arranged to face the light reflection sheet 20, or, a light diffusing sheet 20 may be arranged between the prism sheets 16 and 36.

The following will describe the present invention in detail according to the examples of embodiments.

Figure 2:
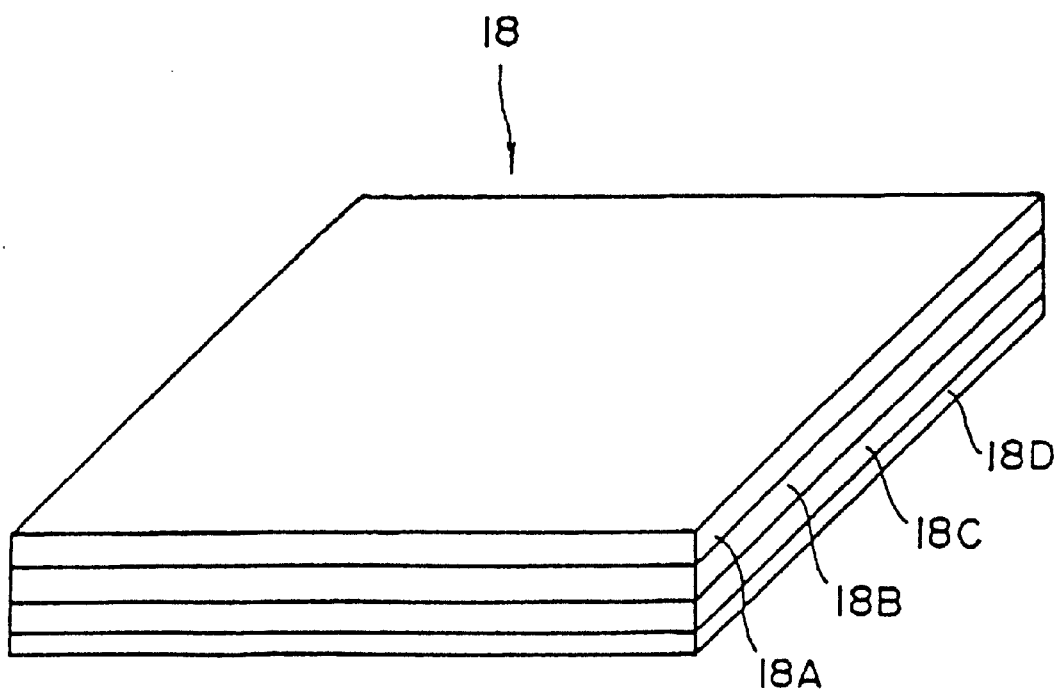
FIG. 2 is a schematic enlarged perspective view of a polarized beam splitter sheet of a backlight device according to an embodiment of the present invention.

The first embodiment of the present invention is related to the backlight device 10 using the polarized beam splitter sheet 18 which includes the cholesteric liquid crystal layer 18C, as shown in FIGS. 1 and 2.

The polarized beam splitter sheet 18 in the backlight device 10 includes, as shown in FIG. 2, the cholesteric liquid crystal layer 18C and the ¼-wavelength phase difference sheet 18B, and the light reflection sheet 20 comprises a PET sheet on which the regular reflection plane 20A composed of a film of evaporated silver is provided.

The direction wherein the intensity of diffused light from the above-mentioned polarized beam splitter sheet 18 is maximal is made to be substantially the same as the directions of the normals, respectively standing on the polarized beam splitter sheet 18, on the prism sheet 16, and on the light reflection sheet 20, by means of the prism sheets 16 and 36, each of which comprises a plurality of unit prisms each made in a form of a triangular pillar whose cross section has a top angle of 90° and is symmetrical.

Furthermore, the axis representing the direction of polarized light transmission by the polarizing plate which is so arranged on the side of the liquid crystal panel (not illustrated) as to be faced to the light guide 12 is made the same as the axis of polarization of the light which is outputted from the polarized beam splitter sheet 18, so that the polarized light is effectively transmitted.

The second embodiment of the present invention is related to a composition in which, as shown in FIG. 11, a second prism sheet 36 having unit prisms which are arranged upward is provided adjacent to the prism sheet 16 which is described in the description of the first embodiment of the present invention, and other elements are the same as those of the first embodiment of the present invention.

The first and second examples for comparison are the compositions each including a light reflection plate made of white PET film (E60L, made by TORAY company) as the substitute of the above-mentioned light reflection sheet 20 which is described in the first and second embodiments of the present invention, respectively; and, for the first and second examples for comparison, the maximum intensities of the light emerging from the polarizer on the front side of the liquid crystal panel in transmission mode are measured with and without the polarized beam splitter sheet, respectively, and the result of the measurements is shown Table 1.

Namely, the use of a polarized beam splitter sheet increases the brightness by about 10% relative to the cases where a conventional light reflection plate of prior art is

|  | Light Reflection Sheet | Prism Sheet | Polarized Beam Splitter Sheet | Front Face Brightness | Brightness Increase |
|---|---|---|---|---|---|
| Example of Embodiment |  |  |  |  |  |
| 1 | Silver | 1 | With | 658 | 1.73 |
|  |  |  | without | 380 |  |
| 2 | Silver | 2 | With | 1020 | 1.45 |
|  |  |  | Without | 704 |  |
| Example for Comparison |  |  |  |  |  |
| 1 | White PET | 1 | With | 730 | 1.56 |
|  |  |  | Without | 468 |  |
| 2 | White PET | 2 | With | 764 | 1.32 |
|  |  |  | Without | 575 |  |

What is claimed is:

1. A backlight device comprising:

a light guide made of light transmitting material in a substantial plate form, which introduces light from, at least, one end face and emanates light from a light output surface that is another face;

a light source that makes the light incident at least on said one end face of the light guide;

a prism sheet, being provided with a plural number of unit prims arranged in one or two dimensions and being arranged on the side of said light output surface of said light guide, that shifts the direction of propagation of the light beam delivered from the light output surface of the light guide in a particular direction and makes the light emerging;

a polarized beam splitter sheet that transmits one polarization component of the light delivered from the prism sheet and reflects the other polarization component of the light; and a light reflection sheet arranged on the side of the light guide opposite to said light output surface to reflect the light from the light guide toward said polarized beam splitter sheet, wherein the light reflection sheet has a flat plane substantially parallel to said polarized beam splitter sheet and the direction of the normal of said polarized beam splitter sheet is substantially the same as the shifted direction of propagation of the light beam emerging from said prism sheet.

2. A backlight device according to claim 1, wherein the direction of the normal of the above-mentioned polarized beam splitter sheet, the direction of the propagation of the light beam, shifted in a particular direction and emerging from the above-mentioned prism sheet, is substantially the same as the direction of the normal of the regular reflection plane of the above-mentioned light reflection sheet.

3. A backlight device according to claim 1, wherein the cross sectional shape of the above-mentioned unit prisms in the above-mentioned prism sheet is symmetrical referring to the normal of the prism sheet; and the direction of the normal of the prism sheet is substantially the same as the direction of the normal of the regular reflection plane of the above-mentioned light reflection sheet.

4. A backlight device according to claim 1, wherein the above-mentioned polarized beam splitter sheet comprises, a cholesteric liquid crystal layer which has a function to separate one rotatory component of the incident light from the other rotatory component, and a ¼-wavelength phase difference layer.

5. A back light device according to claim 1, wherein the above-mentioned polarized beam splitter sheet has a planar multilayer structure made of layers having double refractivity; and the difference in the value of refractive index between the layers adjacent to each other along its thickness direction for one of two light beams having vibration directions perpendicular to each other in a plane is different from the difference in the value of refractive index between the layers adjacent to each other along its thickness direction for the other of the two light beams.

6. A transmission-type of liquid crystal display apparatus comprising a transmission-type of liquid crystal display panel, and a backlight device according to claim 1 which is arranged on the rear face of the transmission- type of liquid crystal display panel so as to illuminate the transmission-type of liquid crystal display on its rear face.

7. A backlight device comprising:

a light guide made of light transmitting material in a substantial plate form, which introduces light from, at least, one end face and emanates light from a light output surface that is another face;

a light source that makes the light incident at least on said one end face of the light guide;

a prism sheet, being provided with a plural number of unit prisms arranged in one or two dimensions and being arranged on the side of said light output surface of said light guide, that shifts the direction of propagation of the light beam delivered from the light output surface of the light guide in a particular direction and makes the light emerging;

a polarized beam splitter sheet that transmits one polarization component of the light delivered from the prism sheet and reflects the other polarization component of the light; and a light reflection sheet arranged on the side of the light guide opposite to said light output surface to reflect the light from the light guide toward said polarized beam splitter sheet, wherein the light from the reflection sheet is delivered toward said polarized beam splitter sheet in substantially the same direction as said particular direction of light beam propagation delivered from the light output surface of the light guide.

* * * * *